May 19, 1942.  I. J. OVERMAN  2,283,455
SPREADER FOR ASPHALT AND THE LIKE
Filed March 7, 1940

INVENTOR.
IVAN J. OVERMAN,
BY Lockwood, Goldsmith & Galt,
ATTORNEYS.

Patented May 19, 1942

2,283,455

UNITED STATES PATENT OFFICE 2,283,455

SPREADER FOR ASPHALT AND THE LIKE

Ivan J. Overman, Marion, Ind., assignor to Overmander Machine, Inc., Marion, Ind., a corporation Application March 7, 1940, Serial No. 322,685

1 Claim. (Cl. 94—44)

This invention relates to a spreader for asphalt and the like.

In the construction of modern highways of asphalt and other paving materials, it is common practice to provide a spreader, the function of which is to distribute the material in such manner as to provide an even surface for the roadway. One form of spreader consists of a frame mounted on ground wheels and carrying a hopper into which the paving material may be shoveled or dumped from a supply truck behind which the spreader is towed. In spreaders of this type it is important that the ground wheels follow a substantially even course in order to provide an even surface either on a level or on the grade at which the highway is to be built. A spreader having the conventional arrangement of four ground wheels on opposite corners of the frame produces noticeable undulations in the surface of the roadway as each wheel passes over a depression or a slight elevation in the surface on which they move. Even when the ground wheels travel on preformed concrete curbing or on specially constructed trackways, a large pebble or similar object on the trackway produces noticeable results. One object of the present invention is to provide a ground wheel structure for spreaders of this type in which the undulations produced in the surface or the roadway by small irregularities in the surface of the ground wheel tracks are minimized as far as possible. This is accomplished by providing eight instead of four ground wheels, arranging the wheels in pairs at opposite ends of equalizer members pivotally mounted on the frame and providing yielding means to resist the relative movement of the equalizer members with respect to the frame. Preferably the ground wheels are provided with low pressure pneumatic tires.

Figure 1:
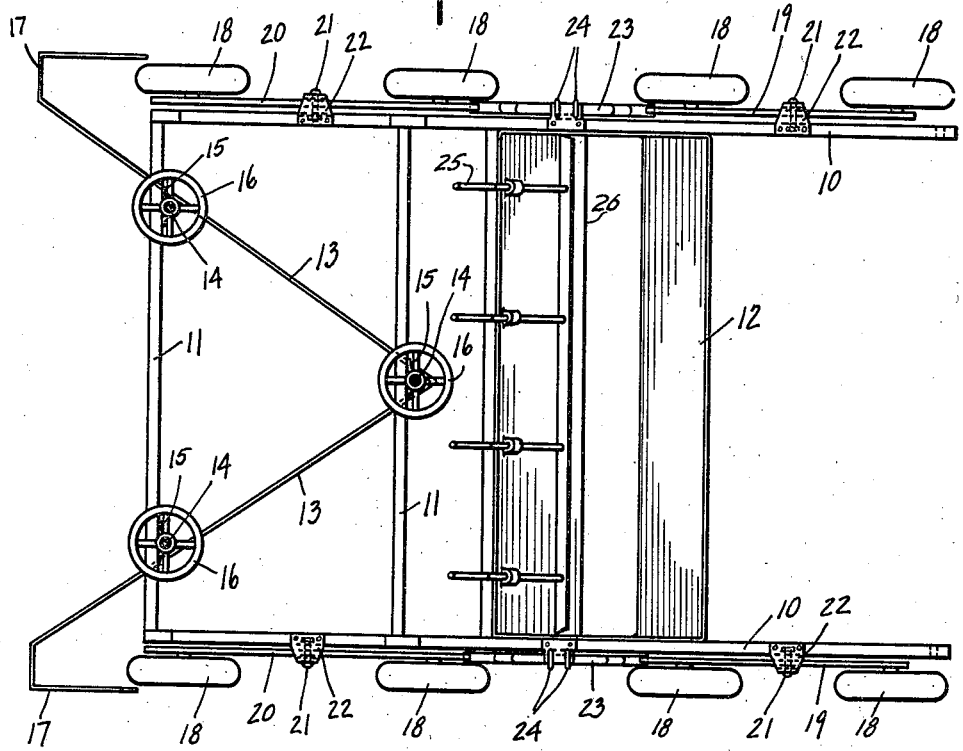
Figure 2:
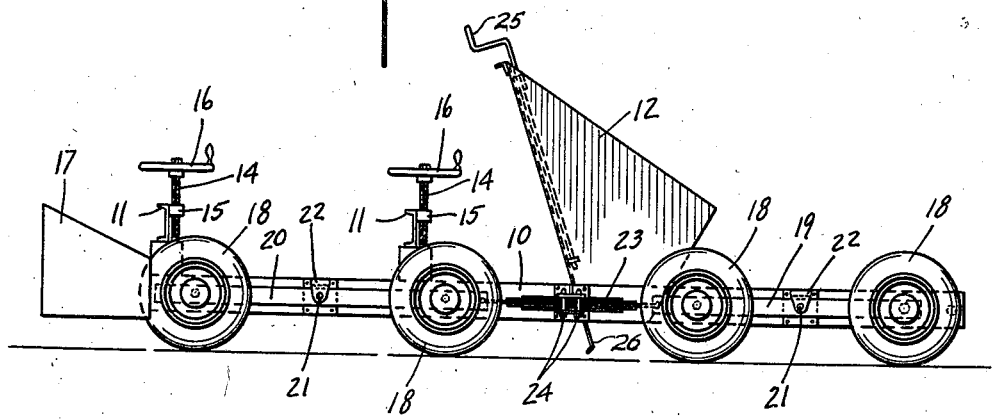

Other objects and features of the invention will be understood from the accompanying drawing and the following description and claim:

Fig. 1 is a plan view of a spreader constructed in accordance with a preferred form of the invention. Fig. 2 is a side view thereof.

In the preferred form of the invention shown in the drawing, the main frame structure of the spreader consists of a pair of longitudinal frame members 10 connected by lateral frame members 11 and other lateral frame members not shown on which there is mounted a hopper 12. A pair of diagonally arranged spreader plates 13 are mounted on vertical screw threaded shafts 14, said shafts being engaged with threaded elements 15 secured to the lateral frame members 11. The shafts 14 carry hand wheels 16 by means of which the forward ends and each of the rear ends of the spreader plates may be raised or lowered with respect to the main frame structure. Each spreader plate terminates at the rear in a shoe 17 in which excess paving material may accumulate. In Fig. 2 the spreader plates are shown raised above the surface of the ground in what may be termed a travelling position. It is to be understood that they may be lowered to ground level when the apparatus is in use.

A plurality of ground wheels 18 provided with low pressure pneumatic tires and herein shown as eight in number are provided, said wheels being arranged in tandem relation, four on each side of the machine. In each series of four wheels the forward pair is pivotally mounted adjacent opposite ends of an equalizer bar 19 and the wheels of the rear pair are similarly mounted on opposite ends of an equalizer bar 20. Each of said equalizer bars 19 and 20 is pivotally mounted on a pin 21 in turn mounted in a fitting 22 secured to the frame member 10.

At each side of the machine there is provided a leaf spring 23 anchored by U-clamps 24 to the frame member 10. The free ends of said springs are secured to the adjacent ends of the equalizer bars 19 and 20. Thus said springs provide a relatively stiff but yielding resistance to movement of the equalizer bars with respect to the main frame structure.

In the use of the invention, the apparatus is attached to a motor truck by any suitable coupling means and is towed by said truck along the roadway. The paving material may be shovelled or dumped from the truck into the hopper as needed and the supply of said material from the hopper to the roadway may be controlled by any suitable gate mechanism at the bottom of the hopper, as for example, the gate 26 which may be raised and lowered by means of hand cranks 25 in a conventional manner. The ground wheels 18 may travel on concrete curbing or specially constructed trackways or may in certain cases rest on the earthen shoulders of the roadway itself.

As long as the ground wheels travel on a substantially even surface, the spreader plates produce a corresponding even surface in the paving material. When one of said wheels passes over a slight irregularity in its trackway there is a tendency for the spreader plates to produce a corresponding irregularity in the surface of the roadway but said tendency is minimized by the construction just described. With the usual four wheel arrangement, when a rear wheel passes such an irregularity, the same is reproduced to substantially full scale in the surface of the roadway adjacent that wheel. The use of the equalizer bar construction even without the springs 23, cuts the vertical movement of the frame in half as each wheel passes an irregularity. The resulting undulations in the surface of the roadway are thus reduced to half scale and are much less noticeable.

The use of the springs 23 still further reduces the scale of irregularities in the roadway and the combination therewith of the use of low pressure pneumatic tires makes such irregularities as may still be formed practically negligible. Without the springs 23 the load carried by each wheel of a pair is substantially equal irrespective of irregularities in the trackway. The springs serve to redistribute the weight by yieldingly opposing movement of the equalizer bars as irregularities are encountered. For example, when one of the wheels reaches a depression in its trackway, the spring resists its tendency to drop into the depression and in so doing relieves the wheel of a part of its load and transfers this part of the load to the second wheel of the pair. The tire of the second wheel is slightly compressed by the additional load while that of the first is permitted to expand. The resulting movement of the frame is less than if the wheel were permitted to drop freely into the depression. Similarly, when one of the wheels strikes a protuberance in the trackway, the load thereon is increased by the spring 23 and that on the second wheel of the pair is decreased again compressing one tire and permitting the other to expand and reducing the total movement of the frame member 10. The characteristics of the springs 23 and the pressure carried in the tires of the wheels 18 determine the efficiency of the apparatus in preventing undulations in the roadway surface and these factors must vary somewhat with the weight of the spreader and contents and with the nature of the irregularities met with in the trackway. They must be determined experimentally for each set of operating conditions.

The invention has been described in one of its preferred forms. Changes in the details thereof may be made by those skilled in the art without departing from the scope of the invention as defined by the appended claim.

The invention claimed is:

In a spreader for asphalt and the like, the combination of a frame structure, equalizer members pivoted adjacent their mid-points to said frame structure adjacent the forward and rear ends of each side thereof, a pneumatic tired ground wheel mounted at each end of each of said equalizer members, and a pair of leaf springs each secured at its mid-point to said frame structure and each having one end attached to the rear end of one of said equalizer members and the opposite end attached to the front end of another.

IVAN J. OVERMAN.